US008498510B2

(12) United States Patent
Bran de León

(10) Patent No.: US 8,498,510 B2
(45) Date of Patent: Jul. 30, 2013

(54) FIBER DISTRIBUTION ENCLOSURE

(75) Inventor: Oscar Fernando Bran de León, Belle Plaine, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 216 days.

(21) Appl. No.: 13/006,189

(22) Filed: Jan. 13, 2011

(65) Prior Publication Data
US 2011/0181158 A1 Jul. 28, 2011

Related U.S. Application Data

(60) Provisional application No. 61/295,929, filed on Jan. 18, 2010.

(51) Int. Cl.
*G02B 6/00* (2006.01)

(52) U.S. Cl.
USPC .......................................... 385/135; 385/139

(58) Field of Classification Search
USPC .................................................. 385/135, 139
See application file for complete search history.

(56) References Cited

U.S. PATENT DOCUMENTS

| 5,734,776 | A | 3/1998 | Puetz | |
|---|---|---|---|---|
| 6,778,752 | B2 * | 8/2004 | Laporte et al. | 385/135 |
| 7,198,409 | B2 | 4/2007 | Smith et al. | |
| 7,218,827 | B2 | 5/2007 | Vongseng et al. | |
| 7,233,731 | B2 | 6/2007 | Solheid et al. | |
| 7,260,301 | B2 | 8/2007 | Barth et al. | |
| 7,277,620 | B2 | 10/2007 | Vongseng et al. | |
| 7,330,625 | B2 * | 2/2008 | Barth | 385/135 |
| 7,376,322 | B2 | 5/2008 | Zimmel et al. | |
| 7,418,181 | B2 | 8/2008 | Zimmel et al. | |
| 7,483,617 | B2 * | 1/2009 | Barth | 385/135 |
| 7,509,017 | B2 | 3/2009 | Kowalczyk et al. | |
| 7,583,885 | B2 * | 9/2009 | Kowalczyk et al. | 385/135 |
| 2003/0223725 | A1 * | 12/2003 | Laporte et al. | 385/135 |
| 2008/0124038 | A1 * | 5/2008 | Kowalczyk et al. | 385/135 |
| 2008/0240665 | A1 * | 10/2008 | Barth | 385/135 |
| 2009/0304341 | A1 * | 12/2009 | Shimirak et al. | 385/135 |

FOREIGN PATENT DOCUMENTS

WO WO 2006/127457 A1 11/2006

OTHER PUBLICATIONS

U.S. Appl. No. 12/875,274, filed Sep. 3, 2010, Solheid et al.
International Search Report and Written Opinion mailed Apr. 1, 2011.

* cited by examiner

*Primary Examiner* — Charlie Peng
*Assistant Examiner* — Mary El Shammaa
(74) *Attorney, Agent, or Firm* — Merchant & Gould P.C.

(57) ABSTRACT

An optical fiber distribution assembly is disclosed. The assembly includes an enclosure formed by a circular base and a cover joined at a waterproof seal. The base includes openings configured to accept an input cable and an output cable. The assembly also includes an inner body formed by four panel members to define four quadrants. In one example, the inner body is formed by two panel members positioned perpendicularly to one another. Disposed on the inner body are plurality of cable management structures including: radius limiters, splice trays, splitters, terminations, and connector storage holders.

10 Claims, 11 Drawing Sheets

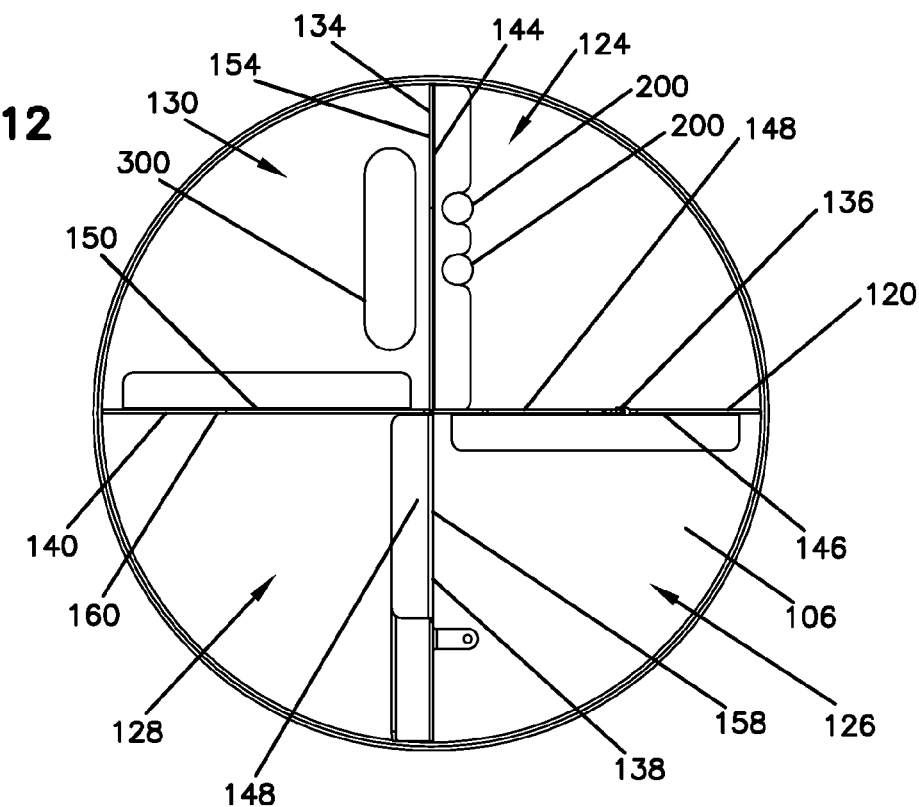
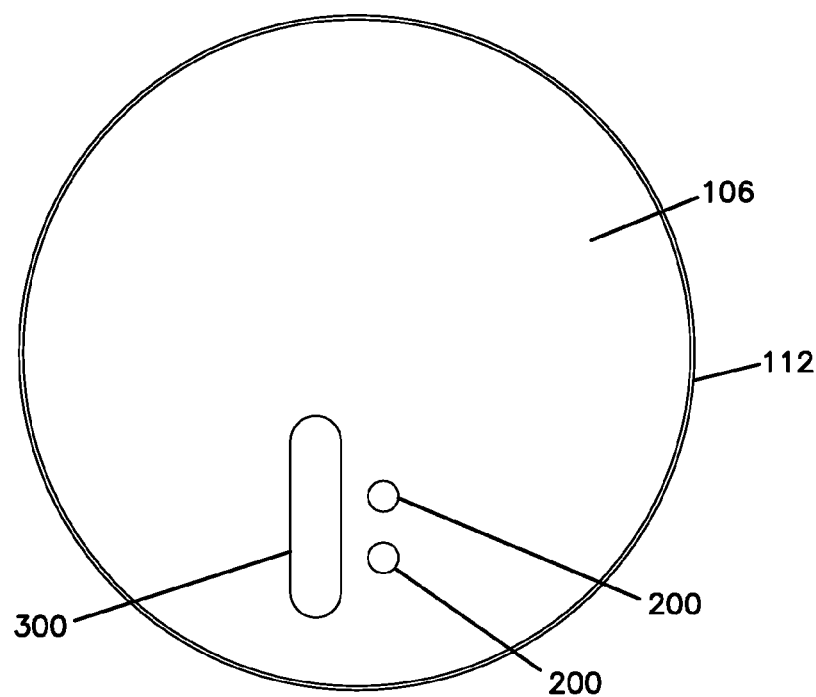

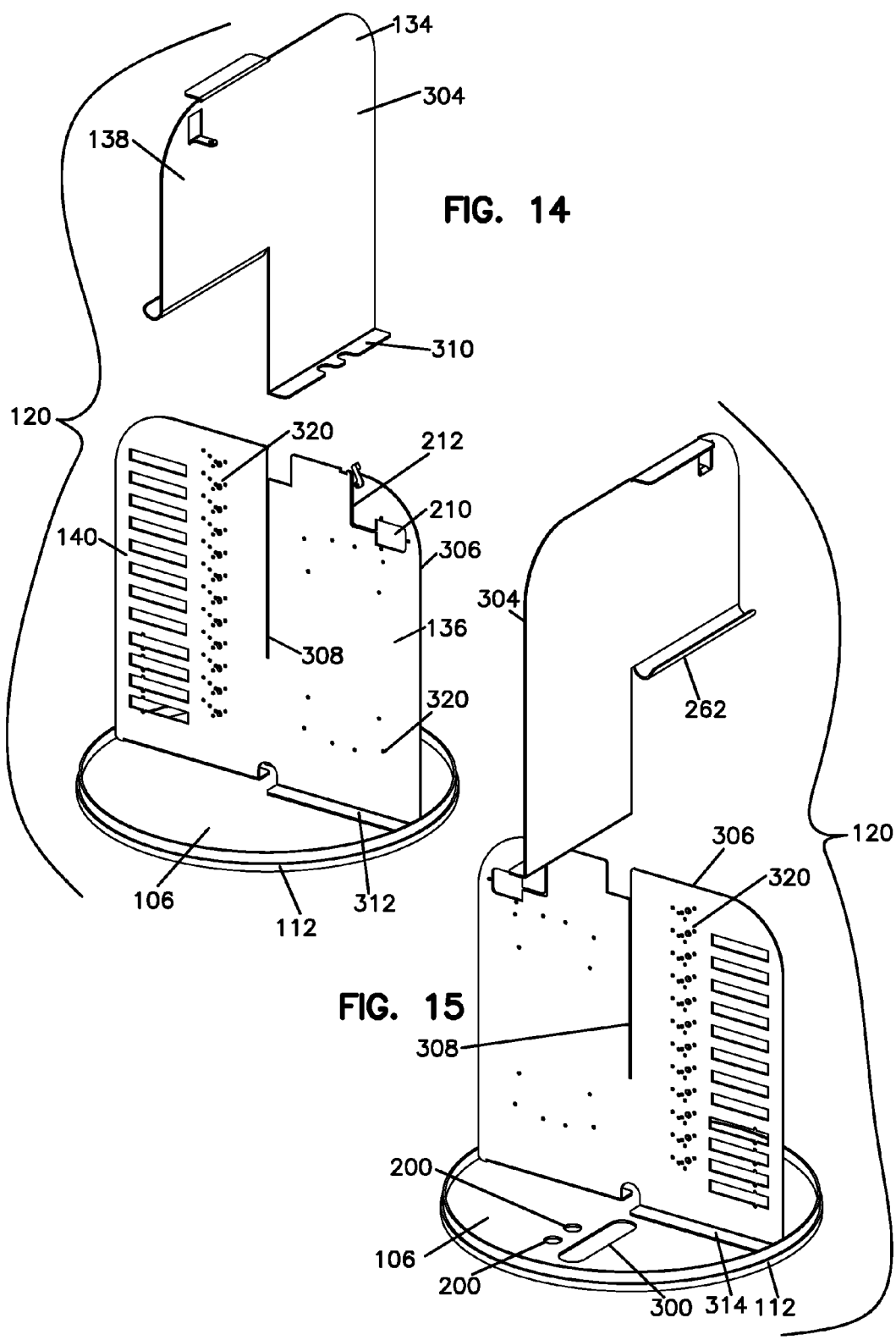

FIBER DISTRIBUTION ENCLOSURE

CROSS REFERENCE TO RELATED APPLICATION

This application claims the benefit of U.S. Provisional Patent Application Ser. No. 61/295,929, filed Jan. 18, 2010, which application is hereby incorporated by reference in its entirety.

TECHNICAL FIELD

The present invention relates generally to optical fiber management. In particular, the present invention relates to optical fiber management in a fiber distribution assembly.

BACKGROUND OF THE INVENTION

Outside plant (OSP) telecommunications equipment, including terminations and splitters, may be housed in protective enclosures. The enclosures may be above ground, or may be below ground. Below-ground solutions are known which store the equipment in a below-ground vault. The vault is typically accessible through a top door.

As demand for telecommunications services increases, optical fiber services are being extended into additional areas. In new construction developments in which future demand for telecommunications services is unknown, it may be cost effective to provide for service capacity which exceeds the current demand. This will allow a telecommunications service provider to quickly and cost-effectively respond to future growth in demand. Optical fiber cables may be extended to a customer's premises prior to that customer actually requesting or needing service. For example, cables may be extended to premises adjacent the premises of a current customer, as it may be cost effective to extend both cables at the same time. The cables may also be extended to new building sites in anticipation of the new occupants of those sites requesting fiber optic service.

Improvements are continually desired for the enclosures.

SUMMARY

The present invention relates to a fiber optic telecommunications distribution assembly and management of optical cables.

According to one aspect, an optical fiber distribution assembly is disclosed. The assembly includes a base, an inner body defining four chambers, and a cover for receiving the inner body and mounting to the base. Cables are input to the assembly through the base and slack is stored in a first chamber. The cables are spliced and split in a second chamber. Cable terminations between cables from the splice and/or splitter are mounted to one of the panels of the inner body with the terminations extending between a third chamber and a fourth chamber. Cables from the terminations are output from the assembly through the base from the fourth chamber.

According to another aspect, an optical fiber distribution assembly is disclosed wherein a circular base supports two generally planar panel constructions which are assembled to form four generally perpendicularly arranged quadrants. A cover receives the inner body and mounts to the base.

In various additional aspects, radius limiters, fanouts, and additional fiber optic routing equipment are included. Additionally, an excess connector storage structure can be included, and is configured to store optical cables carrying secondary signals when not connected for use by a customer.

BRIEF DESCRIPTION OF THE DRAWINGS

FIG. 12 is a top view of the base and the inner body of FIG. 9;

FIG. 13 is a bottom view of the base;

FIG. 14 is an exploded view of the portions of the inner body and the base;

FIG. 15 is a further perspective view of the view of FIG. 14.

DETAILED DESCRIPTION OF THE PREFERRED EMBODIMENT

Figure 1:
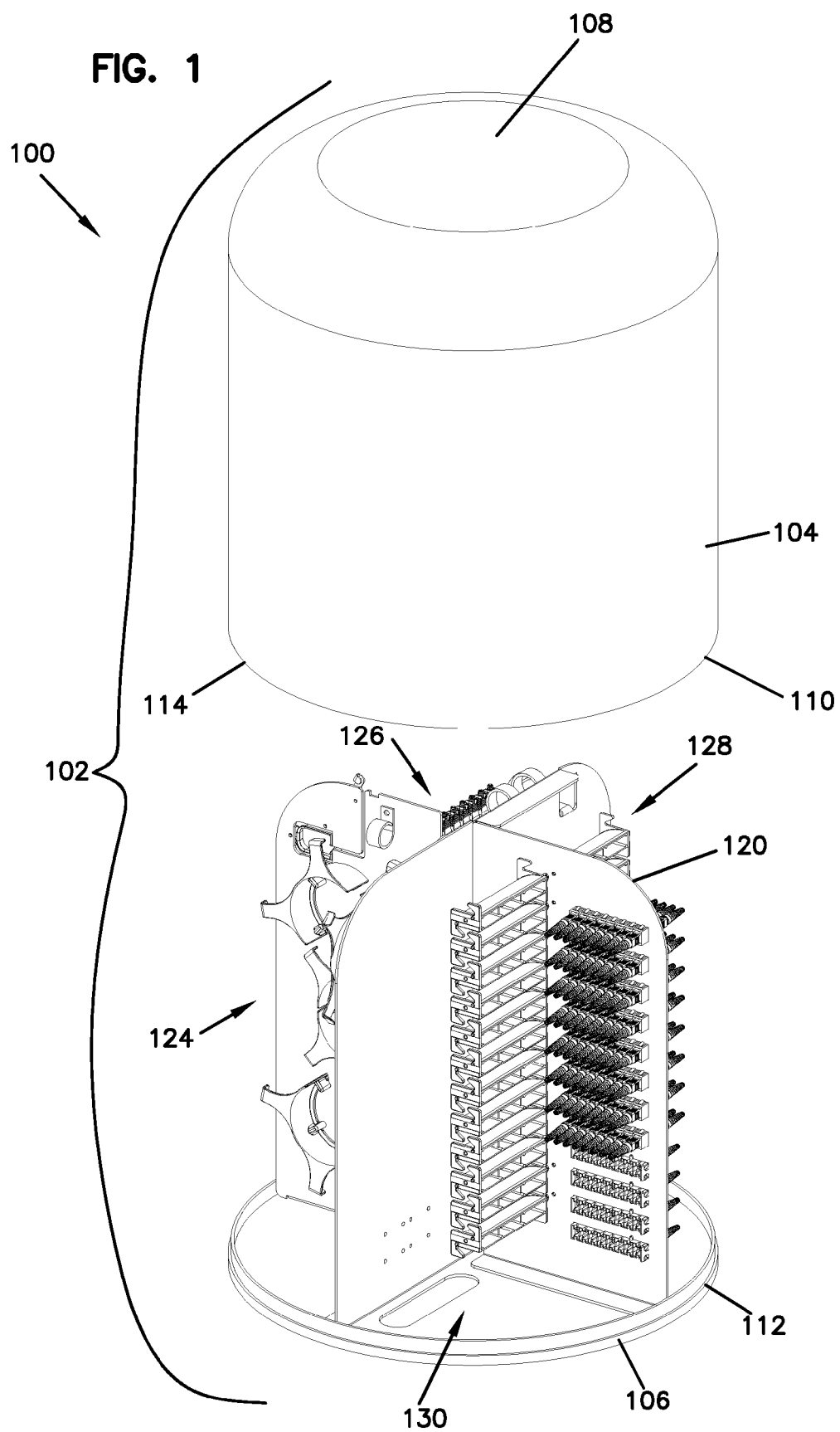
FIG. 1 is a first exploded perspective view of a fiber optic enclosure useable to implement various aspects of the present disclosure.

The present disclosure is generally related to a fiber optic distribution assembly, such as can be used in a variety of above ground and below ground outside plant (OSP) environments. Various embodiments of the present disclosure will be described in detail with reference to the drawings, wherein like reference numerals represent like parts and assemblies throughout the several views. Reference to particular embodiments does not limit the scope of the invention, which is limited only by the scope of the claims attached hereto. Additionally, any examples set forth in the disclosure are not intended to be limiting and merely set forth some of the many possible embodiments for the claimed invention.

Figure 2:
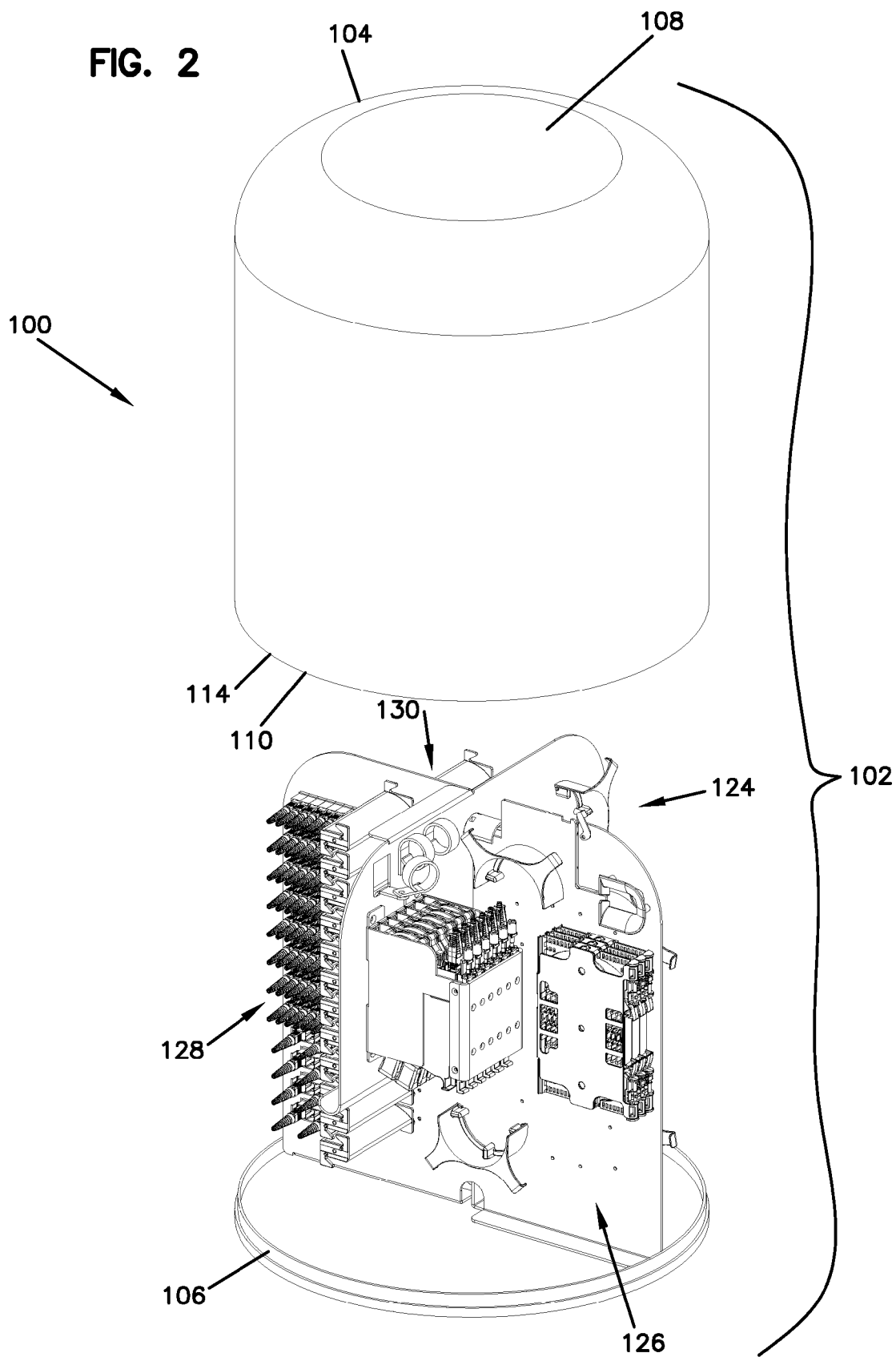
FIG. 2 is a further exploded perspective view of the enclosure of FIG. 1.

Referring now to FIGS. 1 and 2, a fiber distribution terminal (e.g., a hub or pedestal) 100 is shown. Pedestal 100 includes an enclosure 102 which houses the telecommunications equipment. Enclosure 102 is useable in above ground and below ground applications, and can incorporate a number of fiber optic components, as described below. Enclosure 102 includes an upper cover 104 and a lower base 106. Enclosure 102 defines an interior volume for containing fiber optic components. A feeder cable or feeder cables are routed to pedestal 100. Each pedestal administers connections between incoming and outgoing fibers.

Base 106 of enclosure 102 is substantially circular along an outer periphery. Base 106 and cover 104 are constructed from waterproof type materials, such as metal or plastic. Cover 104 has a top 108 and an open bottom 110. Cover 104 and base 106 include mating abutting flanges 112, 114, respectively, and an O-ring (not shown). Abutting flanges 112, 114 are shaped for receiving a V-clamp (not shown) for forming a water-tight seal. In this manner, any water that might be present in an underground vault housing the fiber optic pedestal 100 does not reach the inner components of pedestal 100. An example clamping arrangement between cover 104 and base 106 is described in further detail in U.S. Pat. No. 7,260,301, the disclosure of which is hereby incorporated by reference. It should be noted that a V-clamp/O-ring arrangement is one of the many possible sealing techniques that may be used to form a sealed enclosure 102 for pedestal 100.

Disposed in the interior of enclosure 102 on base 106 is an inner body 120 defining a plurality of chambers 124, 126, 128, 130. Inner body 120 is generally defined by a plurality of panel members 134, 136, 138, 140 that are arranged to define four generally equally sized quadrants on base 106. The various surfaces of panel members 134, 136, 138, 140 are utilized for managing the various fiber optic components and cables disposed within enclosure 102. First panel member 134 includes a first side 144 and an opposite second side 154. Second panel member 136 includes a first side 146 and an opposite second side 156. Third panel member 138 includes a first side 148 and an opposite second side 158. Fourth panel 140 includes a first side 150 and an opposite second side 160.

The various chambers can be utilized as desired for housing the fiber components and cabling. In the example embodiment shown in the Figures, first chamber 124 is for a feeder cable entrance and slack storage. Second chamber 126 is utilized for splicing and splitting of the feeder cable inputs. Third chamber 128 and fourth chamber 130 are used for managing and holding the fiber terminations that connect between the splitter outputs, and the drop cables extending out of enclosure 102. In the preferred embodiment, third chamber 128 also includes connector storage for outputs from the splitters which are not presently in use.

Figure 3:
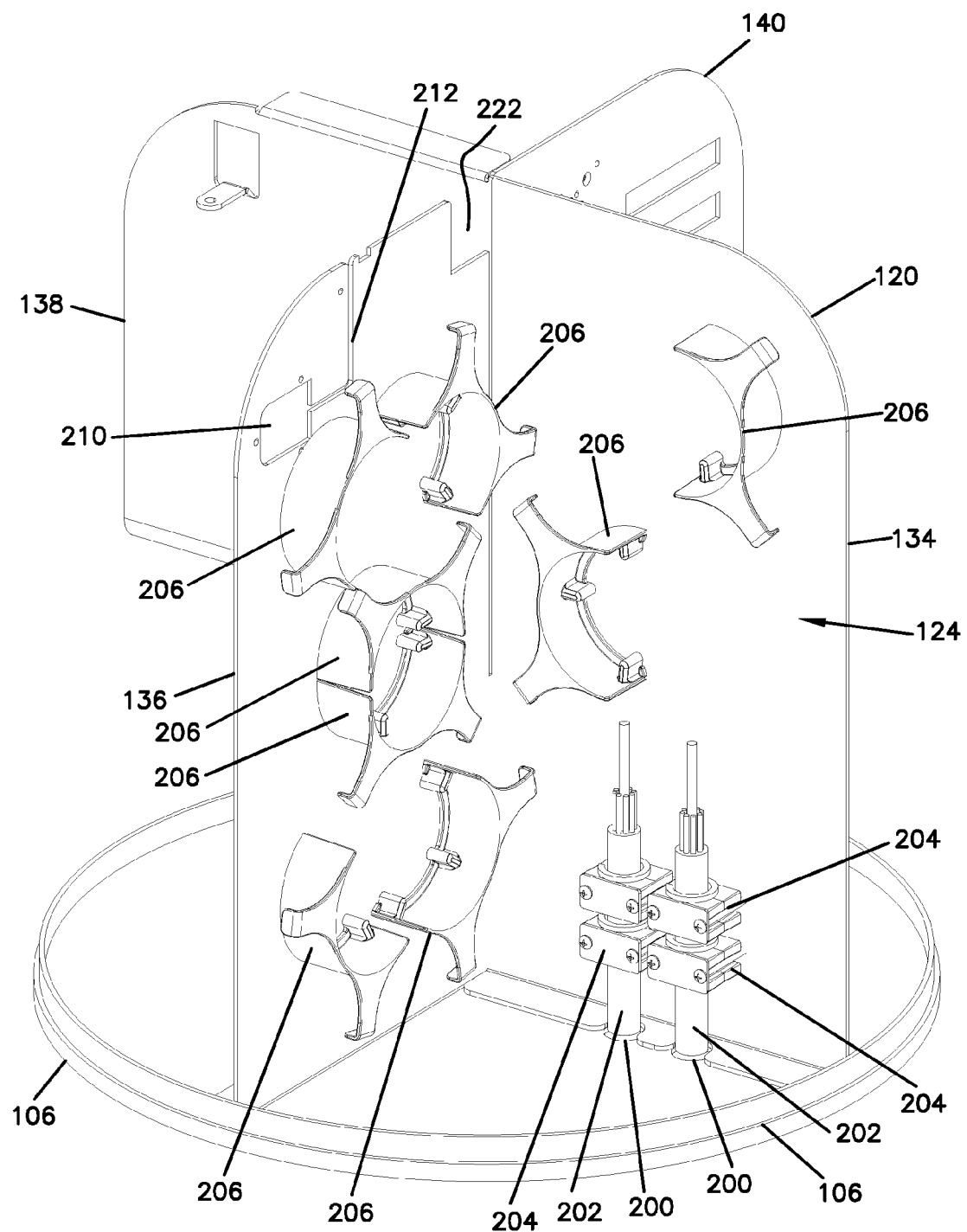
FIG. 3 is a perspective view of the enclosure without the cover, showing the first chamber of the inner body.
Figure 8:
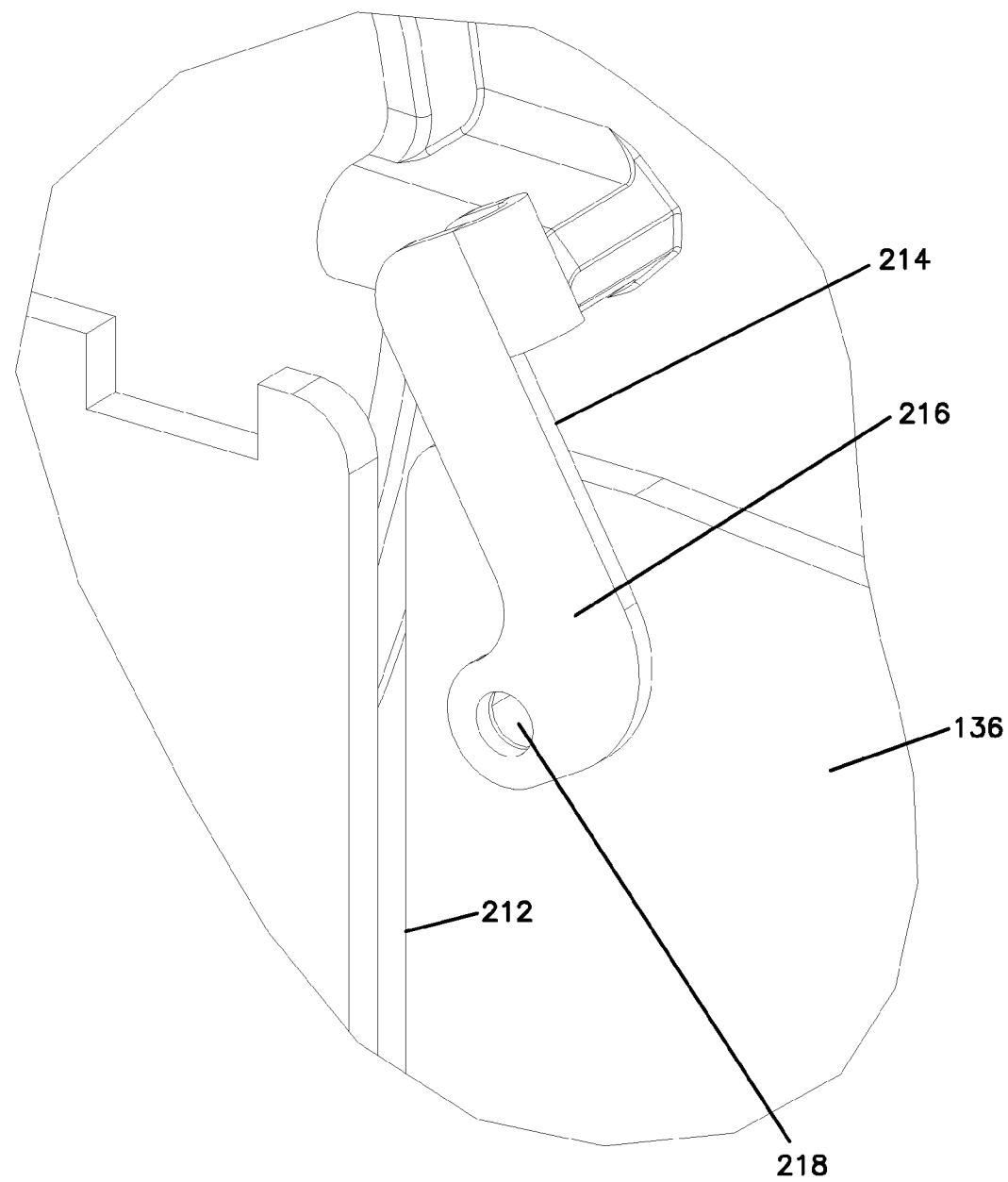
FIG. 8 is an enlarged view of a cable latch associated with a cable passage between the first chamber and the second chamber.
Figure 9:
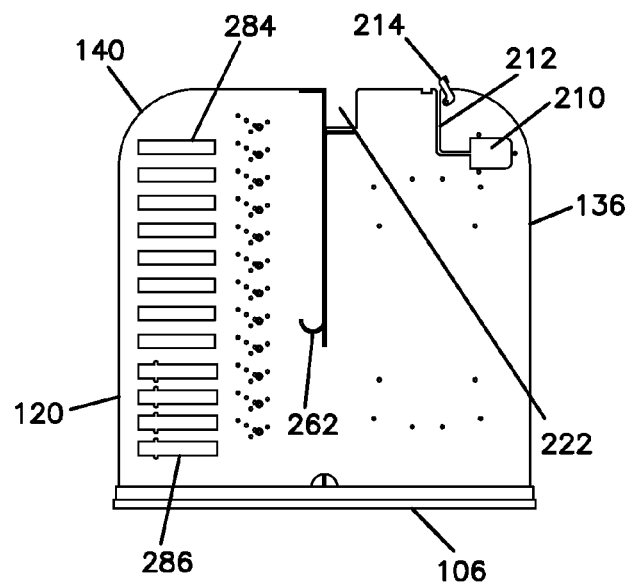
FIG. 9 is a side view of the base and the inner body with cable management portions removed.
Figure 10:
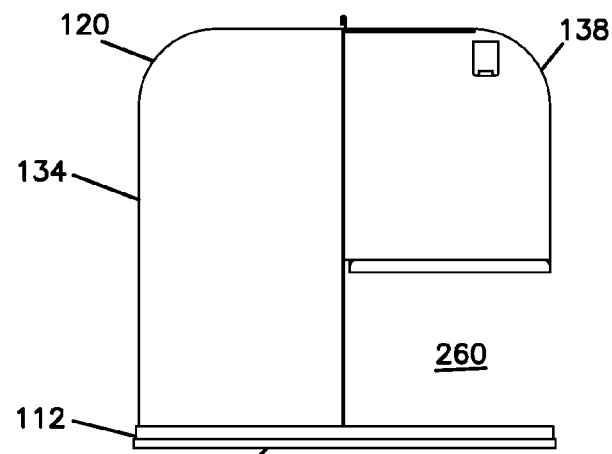
FIG. 10 is a further side view of the base and the inner body of FIG. 9.
Figure 11:
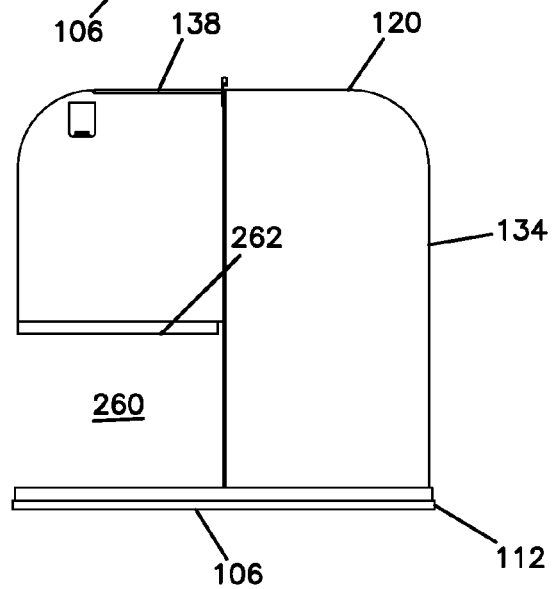
FIG. 11 is a still further side view of the base and the inner body of FIG. 9.

Referring now to FIGS. 3 and 13, base 106 includes one or more openings 200 for feeder cables entering enclosure 102. As shown, two cables 202 are shown entering enclosure 102. Clamps 204 hold feeder cables 202 securely to enclosure 102. The cables and any slack is managed within first chamber 124 by various cable radius limiters 206 in the form of semicircular half spools mounted to panel members 134, 136. Cables extend from first chamber 124 through one or more passages defined by inner body 120 to second chamber 26. A first passage 210 connects first chamber 124 to second chamber 126. Cables are positioned in first passage 210 by passing through an elongated slot 212. In the illustrated example, slot 212 defines an L-shape. A latch 214 helps maintain cables from being removed from passage 210 or slot 212 (see FIGS. 4 and 8). Latch 214 includes a body 216 which pivots around a pivot point 218. Passage 210 includes a radius limiter 220 in the form of an edge protector. A second cable passage 222 is shown adjacent a top of second panel member 136 of inner body 120. Cable protection is provided by a curved edge 224 adjacent passage 222.

Figure 4:
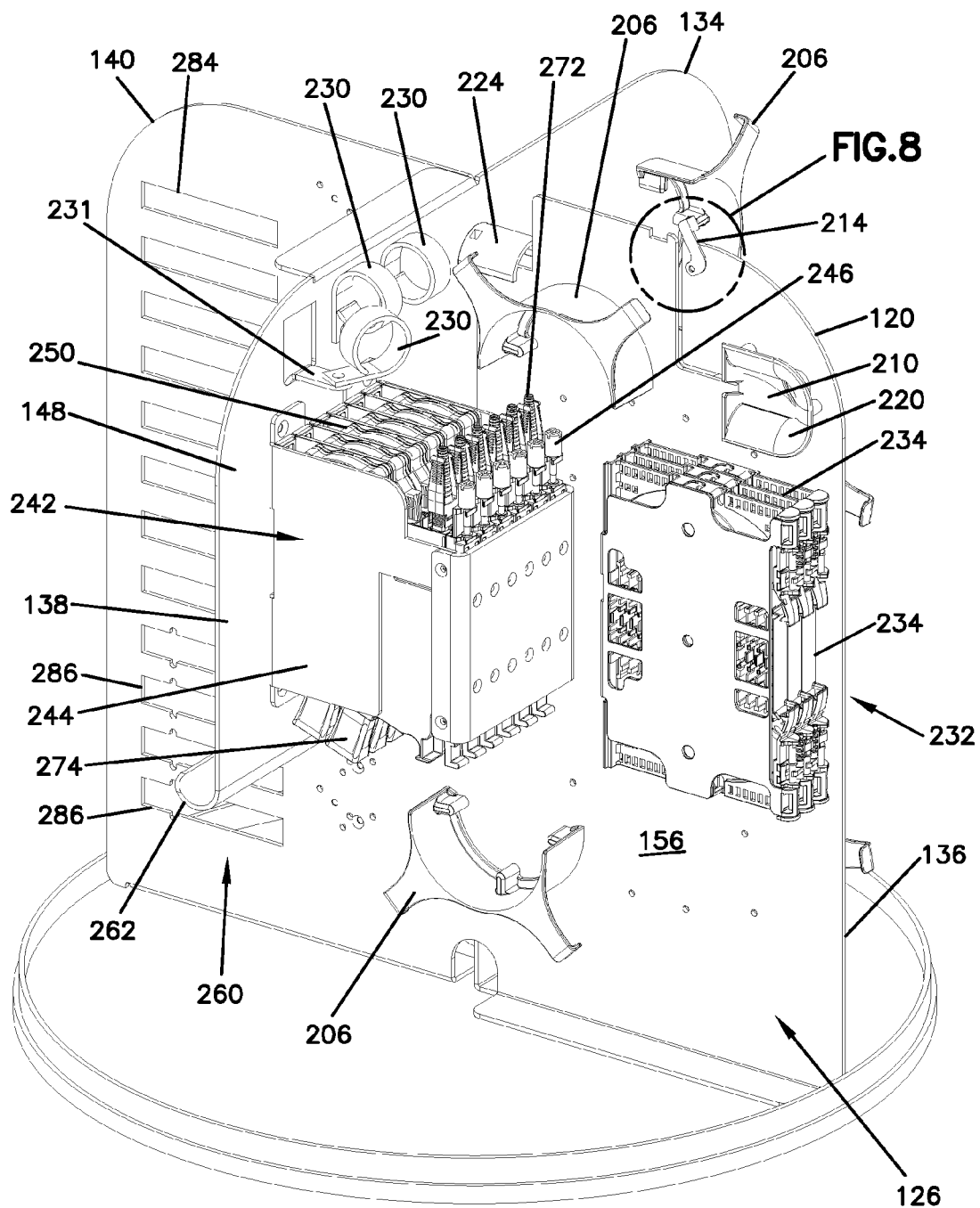
FIG. 4 is a perspective view of the inner body and base showing the second chamber.
Figure 5:
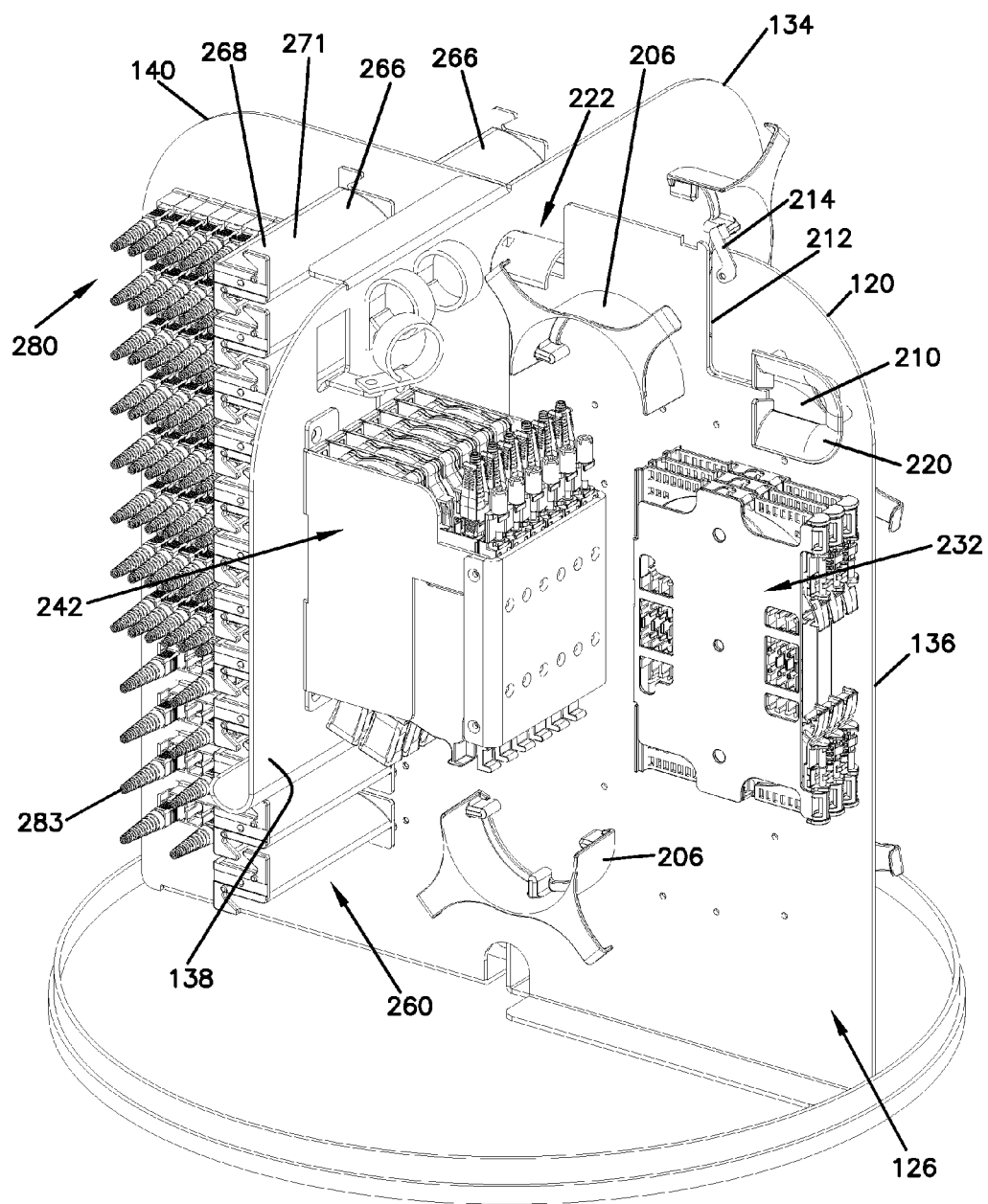
FIG. 5 is a further view of the inner body and base including the second chamber, and showing cable management structures and terminations in the third chamber.

Referring now to FIGS. 4 and 5, cables entering second chamber 126 are managed by one or more radius limiters 206 and/or cable clips 230. Clips 230 can mount to surface 148 directly or they can be mounted to a projecting tab 231. The cables entering second chamber 126 can be spliced to further cables at splice area 232. Splice area 232 includes a plurality of splice trays 234 which hold the splicing components. Splice trays 234 are mounted to surface 156 of panel member 136. Outputs from splice area 232 can pass to a splitter area 242 in second chamber 126. Splitter area 242 includes a splitter chassis 244 mounted to surface 148 of third panel member 138. Splitter chassis 244 includes a plurality of removable adapter modules 246 for connecting to cables with connectors from splice area 232, or from first chamber 124 directly. Splitter chassis 244 also holds a plurality of splitters 248 which split input cables entering at location 272 into a plurality of output exiting at location 274. Splitters 248 are shown in the example as plug and play arrangements which plug into the adapter modules 246 and chassis 244. Similar arrangements are shown in U.S. Pat. Nos. 7,418,181 and 7,376,322, the disclosures of which are hereby incorporated by reference.

A lower passage 260 is defined along a bottom edge of third panel member 138. Bottom edge 262 is defined by a curved edge construction for bend radius protection.

Figure 6:
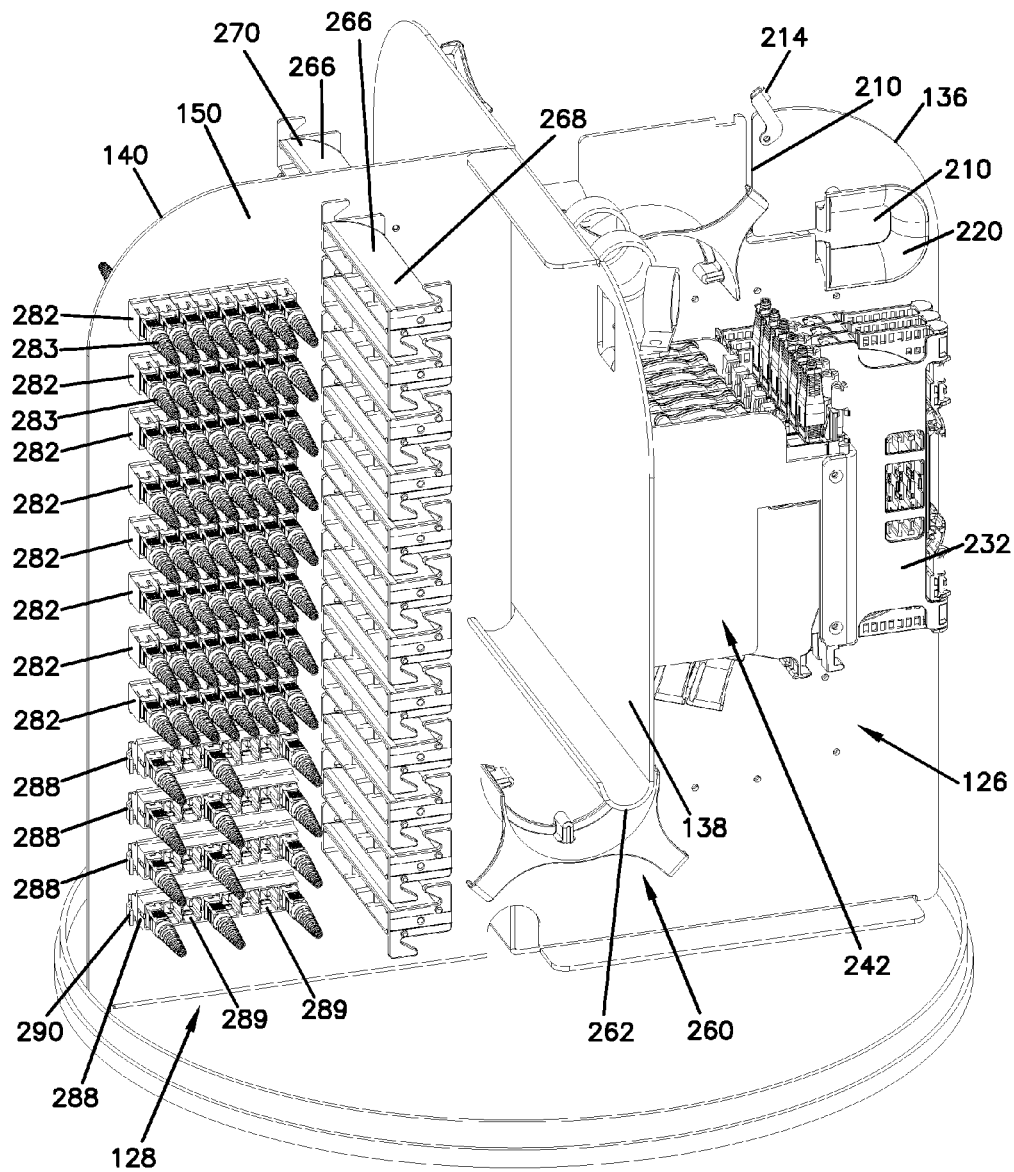
FIG. 6 is a perspective view of the inner body and base showing the third chamber.
Figure 7:
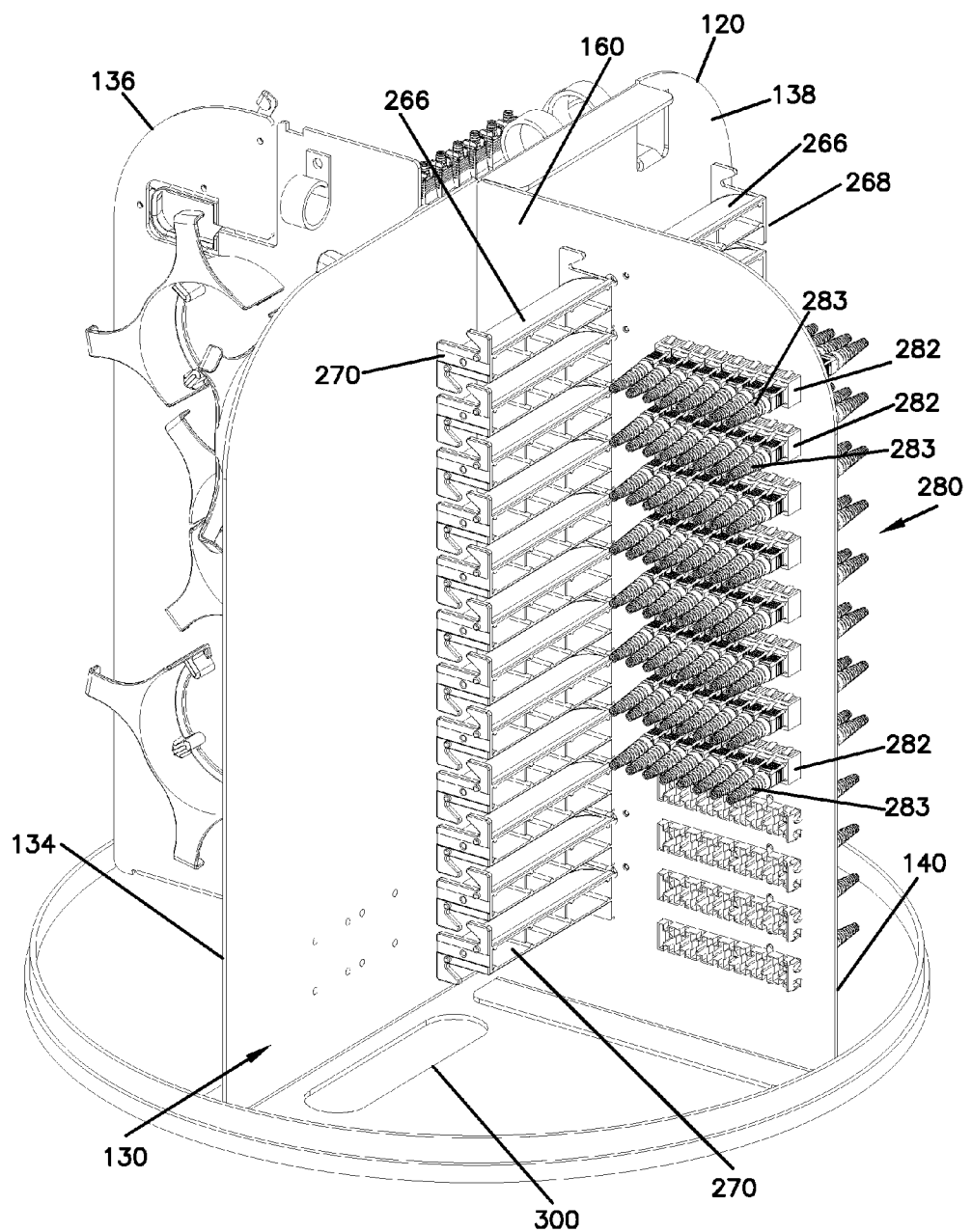
FIG. 7 is a perspective view of the inner body and base showing the fourth chamber.

Referring now to FIGS. 6 and 7, a plurality of radius limiters 266 in the form of linear fanning members are provided in two vertical columns 268, 270, one on each opposite side 150, 160 of fourth panel member 140. Radius limiters 266 include a curved surface 271 for bend radius protection. Radius limiters 266 of a similar construction are shown in U.S. Pat. No. 7,509,017, the disclosure of which is hereby incorporated by reference. Radius limiter 266 can be a variety of shapes or other structures. In the example shown, radius limiters 266 are generally longitudinally shaped extensions extending from fourth panel member 140.

Panel 140 also includes a plurality of fiber terminations 280 defined by adapters 282 for connecting two fiber optic connectors 283. One fiber optic connector 283 on side 150 is an output from one of the splitter modules 250. The other connector 283 on side 160 forms an end of a drop cable which exits enclosure 102. The two connectors 283 connect for signal transmission through an adapter 282. Fourth panel member 140 includes a plurality of openings 284 for receiving the fiber optic adapters 282 (see FIG. 4). Eight adapters 282 are shown in each opening 284. The example of connectors 283 and adapters 282 are SC type. Other types can be used.

Fourth panel member 140 further includes a plurality of openings 286 for receiving a plurality of fiber optic connector holders 288 used to store output cables from the splitter modules 250 until ready for connection to a customer at terminations 280. Connector holders 288 include a latching arrangement 290 to facilitate snap-fitting of the connector holders 288 within openings 286. Connector holders 288 are adapted for storing and protecting the connectorized ends 282 of the splitter outputs when the splitter outputs are not connected to a drop cable at one of the adapters 282. Further details regarding example embodiments of connector holders 288 can be found in U.S. Pat. Nos. 7,218,827; 7,277,620; 7,233,731; and 7,198,409, the disclosures of which are hereby incorporated by reference. A drop cable opening 300 is provided in base 106 for the drop cables exiting pedestal 100. As shown eight rows of terminators 280 and four rows of connector holders 288 are provided in the illustrated embodiment.

Splitter chassis 244 houses a plurality of the splitter modules 250 that split the incoming optical signals carried through an input cable (e.g. a feeder cable, an outside plant cable, or an OSP cable), routed into the enclosure 102 through base 106, into a plurality of secondary signals which can be distributed through output cables exiting base 106 to customer locations. In the embodiment shown, splitter chassis 244 accepts up to six splitter modules 250. Different numbers of splitter modules are possible depending upon the size of the enclosure and the number of connections desired. Each splitter module 250 includes one or more input connectors that extend along the module. The input connectors shown are SC type connectors. Adapter modules 246 are positioned and arranged at the inputs of one or more splitter modules 250 such that when an input cable is slidably inserted into splitter chassis 244, the input connector or connectors of the splitter modules 250 plug into the adapter modules 246.

Once an input cable is connected to the splitter module 250 through the input connector (e.g., SC type), each signal is split into plural signals (e.g., 24 signals) by internal splitter circuitry within the module. This type of splitter configuration is called a 1×24 splitter. It should be noted that other splitter configurations such as a 1×32 splitter, a 2×16 splitter, a 1×16 splitter, etc., could be used in other embodiments depending upon the desired service. Split signal cables (e.g., secondary cables) are then directed out of outputs 274 of splitter modules 250. The split output signal cables are also preferably terminated with connectors.

As additional customers require fiber optic service, splitter modules 250 may be added to the pedestal 100 until splitter chassis 244 is full. The splitter modules 250 can be added or removed from splitter chassis 244 without interrupting or disrupting activity of other splitter modules present in the chassis. Each splitter module 250 includes preconnectorized split cable signals which can be stored in the access connector storage holders 288, described below, until use in terminations 280.

For those customers that are not yet ready to receive fiber optic service, excess connector storage is provided by holders 288 adjacent to terminations 280. A number of the split signal cables may be directed to the holders 288 rather than adapters 282 of terminations 280. The excess connector storage holders 288 includes plurality of openings 289 for receiving and releasably holding fiber optic connectors such as the connectors on the split cable signals extending from the splitter modules 250. In the embodiment shown, the connector holders 288 each hold eight connectors 283. In other embodiments, more or fewer connectors can be held into storage holders 288. The openings in holders 288 may not provide a continuous optical path but rather house and protect a polished end face of a fiber connector. This protection may be provided in combination with an end cap (dust cap).

In the illustrated embodiment, all of terminations 280 are shown fully populated by connectors 283. In actual use, it is likely that some adapters 282 will be open, with service not being provided to every drop cable.

Referring now to FIGS. 9-15, further views of the base 106 and the inner body 120 are shown. In one preferred construction, a first panel construction 304 is fixed to base 106. A second panel construction 306 is positioned perpendicularly to first panel construction 304 and affixed to base 106. First panel construction 304 forms first and third panel members 134, 138, noted above. Second panel construction 306 forms second and fourth panel members 136, 140, noted above. Second panel construction 306 includes a slot 308 which opens upwardly and which receives first panel construction 304. A lower flange 310 on first panel construction 304, and two lower flanges 312, 314 on second panel construction 306 mount the panel constructions 304, 32 to base 106, such as by welding or fasteners. FIGS. 14 and 15 show various holes 320 for use in mounting the cable management devices. Generally panel constructions 304, 306 are plate shaped panels with end flanges for mounting purposes or cable management. Base 106 is shown as having a circular periphery. Cover 104 is generally cylindrical with a rounded upper edge. In normal use, base 106 is mounted horizontally, and cover 104 is lifted vertically to separate it from base 106. As shown in FIG. 12, the preferred embodiment includes generally equally shaped chambers 124, 126, 128, 130.

Cables entering pedestal 100 enter through base 106 and move from chamber to chamber within enclosure 102. The input cables are initially clamped and slack is organized in first chamber 124. The input cables are spliced and/or split in second chamber 126. The radius limiters 266 of first column 268 manage the cables from the splices and splitters toward terminations 280 or connector holders 288 in third chamber 128. Cables extending from terminations 280 in fourth chamber 130 are managed by radius limiters 266 of second column 270 in fourth chamber 130 where they exit enclosure 102 through base 106 for passage to the desired customer premises.

The above specification, examples and data provide a complete description of the manufacture and use of the inventive aspects of the present disclosure. Since many embodiments of the inventive aspects can be made without departing from the spirit and scope of the disclosure, the inventive aspects reside in the claims hereinafter appended.

The invention claimed is:

1. An optical fiber distribution assembly comprising:
   an enclosure having a top, a bottom, and an interior, the enclosure formed by a cylindrical base and a cover joined at a seal, the base including a plurality of cable openings, including a first opening configured to accept an input cable carrying an input signal and a second opening configured to accept an output cable carrying an output signal;
   an inner body extending from the base and positioned in the interior of the enclosure, wherein the inner body includes a plurality of panel members positioned perpendicularly to one another and arranged to form first, second, third, and fourth chambers;
   wherein an input area for a cable entering the enclosure, and a cable clamp for the cable entering the enclosure, and a plurality of first cable radius limiters for storing slack is defined by the first chamber;
   wherein a plurality of cable management devices for directing cables within the second chamber to the third chamber, a splice area and a splitter area are defined by the second chamber;
   wherein fiber terminations are positioned between the third chamber and the fourth chamber;
   wherein a cable output area having a plurality of rows and columns of cable terminations defined by fiber adapters is defined by the fourth chamber.

2. The assembly of claim 1, wherein the first chamber includes cable radius limiters positioned on both panel surfaces which form the first chamber.

3. The assembly of claim 1, wherein a plurality of splice trays are positioned on a surface of one panel of the second chamber, and wherein a splitter chassis including a splitter is positioned on a surface on the other panel which forms the second chamber.

4. The assembly of claim 3, wherein the panel between the second and the third chambers defines a passage along a lower surface of the third panel for passing cables to the third chamber.

5. The assembly of claim 1, further comprising a connector holder positioned on the fourth panel adjacent the fiber terminations for storage of connectors from the splitter area.

6. The assembly of claim 1, wherein a cable passage between the first chamber and the second chamber is defined by a passage through the second panel, and a smaller slot extending from an edge of the second panel to the passage.

7. An optical fiber distribution assembly comprising:
a cylindrical base;
an inner body mounted to the cylindrical base and including two panel portions positioned perpendicularly to one another to define four equally positioned quadrants on base;
a dome cover for connecting to the base at a seal;
wherein an input area for a cable entering an enclosure of the optical fiber distribution assembly and slack storage is defined by a first quadrant;
wherein a splice area and a splitter area are defined by a second quadrant;
wherein fiber terminations are positioned between a third quadrant and a fourth quadrant;
wherein a cable output area is defined by the fourth quadrant.

8. The assembly of claim 7, wherein one panel portion includes a slot to receive the other panel portion.

9. An optical fiber distribution assembly comprising:
an enclosure having a top, a bottom, and an interior, the enclosure formed by a cylindrical base and a cover joined at a seal, the base including a plurality of cable openings, including a first opening configured to accept an input cable carrying an input signal and a second opening configured to accept an output cable carrying an output signal;
an inner body extending from the base and positioned in the interior of the enclosure, wherein the inner body includes a plurality of panel members arranged to form four chambers;
wherein an input area for a cable entering the enclosure and slack storage is defined by a first chamber;
wherein a splice area and a splitter area are defined by a second chamber;
wherein fiber terminations are positioned between a third chamber and a fourth chamber;
wherein a cable output area is defined by the fourth chamber;
wherein the inner body includes two panel portions arranged perpendicularly to define the panel members and the four chambers;
wherein the first chamber includes:
a. a cable clamp for the cable entering the enclosure;
b. a plurality of first cable radius limiters for storing slack;
wherein a first cable passage connects the first chamber to the second chamber;
wherein the second chamber includes:
a. a plurality of splice trays;
b. a plurality of splitter modules;
c. a plurality of cable management devices for directing cables within the second chamber to the third chamber;
wherein a second passage connects the second chamber to the third chamber;
wherein the third chamber includes:
a. a first column of second radius limiters;
b. a plurality of rows and columns of cable terminations including a plurality of fiber adapters;
c. a plurality of connector holders for holding unused connectors;
wherein the fourth chamber includes:
a. a plurality of rows and columns of cable terminations defined by the fiber adapters;
b. a second column of second radius limiters.

10. A method of managing telecommunications cables comprising:
passing an input cable through a lower base of a pedestal into a first chamber of an inner housing of the pedestal, the inner housing further having second, third and fourth chambers;
routing slack of the input cable around cable spools in the first chamber;
routing the input cable to a second chamber having a common wall with the first chamber;
splicing the input cable to a second cable within the second chamber;
splitting the second cable into a plurality of output cables within the second chamber;
routing the output cables to the third chamber, the second and third chambers having a common wall;
connecting each of the output cables to either an adapter mounted to a panel which defines a common wall with the third chamber and the fourth chamber, or a connector holder mounted to the panel;
connecting each adapter to a drop cable located within the fourth chamber; and
passing each drop cable through the lower base to exit the pedestal, and
arranging a plurality of panel members positioned perpendicularly to one another to form the first, second, third and fourth chambers;
wherein the first chamber is defined by an input area for a cable entering the enclosure, a cable clamp for the cable entering the enclosure, and a plurality of first cable radius limiters for storing slack;
wherein the second chamber is defined by a splice area, a splitter area, and a plurality of cable management devices for directing cables within the second chamber to the third chamber;
wherein fiber terminations are positioned between the third chamber and the fourth chamber;
wherein the fourth chamber is defined by a cable output area having a plurality of rows and columns of cable terminations defined by fiber adapters.

* * * * *